US011340884B2

(12) United States Patent
Ucar

(10) Patent No.: US 11,340,884 B2
(45) Date of Patent: May 24, 2022

(54) SYSTEMS AND METHODS FOR DISTRIBUTING UPDATES

(71) Applicant: Toyota Motor Engineering & Manufacturing North America, Inc., Plano, TX (US)

(72) Inventor: Seyhan Ucar, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 67 days.

(21) Appl. No.: 16/447,047

(22) Filed: Jun. 20, 2019

(65) Prior Publication Data

US 2020/0401391 A1    Dec. 24, 2020

(51) Int. Cl.
*G06F 8/65* (2018.01)
*G01C 21/34* (2006.01)
*H04L 29/08* (2006.01)
*G05D 1/00* (2006.01)
*G06Q 50/30* (2012.01)
*H04L 67/104* (2022.01)

(52) U.S. Cl.
CPC ............ *G06F 8/65* (2013.01); *G01C 21/3415* (2013.01); *G01C 21/3438* (2013.01); *G05D 1/0088* (2013.01); *G06Q 50/30* (2013.01); *H04L 67/104* (2013.01); *G05D 2201/0213* (2013.01)

(58) Field of Classification Search
CPC .............................. G06F 8/65; G01C 21/3415
USPC ........................................................ 717/168
See application file for complete search history.

(56) References Cited

U.S. PATENT DOCUMENTS

| 9,088,613 | B2 | 7/2015 | Wahler | |
| 9,451,020 | B2* | 9/2016 | Liu | ........................ H04W 76/10 |
| 9,464,905 | B2 | 10/2016 | Lewis | |
| 9,905,133 | B1 | 2/2018 | Kumar et al. | |
| 10,473,470 | B2* | 11/2019 | Iagnemma | .............. G01C 21/30 |
| 2008/0005733 | A1* | 1/2008 | Ramachandran | .......... G06F 8/65 |
| | | | | 717/168 |
| 2011/0320089 | A1* | 12/2011 | Lewis | .................... H04W 12/04 |
| | | | | 701/29.6 |
| 2014/0136730 | A1* | 5/2014 | Wahler | ................... H04W 4/024 |
| | | | | 709/242 |
| 2014/0308902 | A1* | 10/2014 | Ricci | ...................... G06Q 30/00 |
| | | | | 455/66.1 |
| 2014/0351803 | A1* | 11/2014 | Hoffman | ................... G06F 8/65 |
| | | | | 717/168 |
| 2016/0021178 | A1* | 1/2016 | Liu | ......................... H04L 41/06 |
| | | | | 370/216 |
| 2016/0041820 | A1 | 2/2016 | Ricci et al. | |

(Continued)

*Primary Examiner* — Lewis A Bullock, Jr.
*Assistant Examiner* — Theodore E Hebert
(74) *Attorney, Agent, or Firm* — Christopher G. Darrow; Darrow Mustafa PC

(57) ABSTRACT

System, methods, and other embodiments described herein relate to updating distributed devices. In one embodiment, a method includes, in response to acquiring, in a delivery device that is mobile, an update for a software package, identifying an update target that is associated with at least one update device that includes the software package that is to be updated. The method includes communicating, upon locating the update target, the update directly to the at least one update device to permit the at least one update device to revise the software package using the update.

18 Claims, 5 Drawing Sheets

(56) References Cited

U.S. PATENT DOCUMENTS

| | | |
|---|---|---|
| 2017/0010616 A1 | 1/2017 | Shashua et al. |
| 2017/0228236 A1* | 8/2017 | Nakahara ................. G06F 8/654 |
| 2018/0024565 A1 | 1/2018 | Fridman |
| 2018/0093623 A1* | 4/2018 | Terwilliger ......... B60R 16/0236 |
| 2018/0113470 A1* | 4/2018 | Iagnemma ......... G01C 21/3407 |
| 2019/0102161 A1* | 4/2019 | Short ..................... G06Q 10/00 |

* cited by examiner

SYSTEMS AND METHODS FOR DISTRIBUTING UPDATES

TECHNICAL FIELD

The subject matter described herein relates, in general, to updating software, and, more particularly, to a mobile device that delivers software updates to other devices that do not have direct access to the updates.

BACKGROUND

As technology advances, smart devices have become ubiquitous. Many devices that once were "dumb" devices now include intelligent systems to improve operation. These devices can include nearly any type of device from large devices such as vehicles that operate autonomously to the seats within the vehicles that can remember settings and automatically adjust for different passengers. Along with the ubiquity of intelligent devices comes the need to update the devices with software patches for bugs/vulnerabilities, new data, new features, and other such aspects. Often, updating a device can affect the viability of the device to continue functioning. However, while these devices may include intelligent systems executing software to achieve some improved functionality, the process of distributing updates to the devices can be quite cumbersome.

For example, many intelligent devices do not have the ability to communicate over wireless networks to receive such updates. That is, even if a device has the appropriate hardware, which many do not, to communicate over a cellular network or another wireless network to receive the updates, many different factors can frustrate the process. For example, the devices may not have access to adequate bandwidth because of costs or other restrictions. Additionally, some devices may encounter connection troubles from changing network configurations or other configurability issues. As a result, many devices can be left without needed updates, which may result in loss of functions or complete failure of the device over time.

SUMMARY

Example systems and methods disclosed herein relate to facilitating the distribution of software updates using mobile devices to provide the updates directly via peer-to-peer connections. In one embodiment, systems and methods are disclosed that provide for disseminating updates in an ad-hoc approach. For example, in one aspect, a system includes a mobile device such as a vehicle that is operating as a mobility-as-a-service (MaaS) transport such as a ride-sharing vehicle, an e-haling taxi, or in a similar capacity. Thus, the mobile device generally travels throughout a geographic area as a MaaS vehicle and includes the ability to communicate with a server or cloud-based system to acquire software updates for software that is executing on the mobile device or for generally any software.

Moreover, the mobile device also generally has the ability to communicate directly via a peer-to-peer connection (e.g., short-range wireless connection) with other devices needing the update. Accordingly, the mobile device may adjust routes when providing rides as a MaaS transport, or otherwise, simply identify devices in need of the update and navigate to an area of the devices. In various approaches, the mobile device may navigate to a known location of a device or set of devices, an area where devices needing an update are predicted to be located (e.g., event, location corresponding with particular traffic patterns, etc.), a roadway corridor with statically mounted devices (e.g., smart traffic signs), and so on. Once located, the mobile device establishes a peer-to-peer (P2P) connection with the identified device, and wirelessly communicates the update. As an aspect of the updating, the mobile device may follow the updating device to ensure the update is wholly communicated thereto before continuing along a route. In this way, the mobile device acts as a distribution resource to improve the conveyance of the software update to other devices in need of the update that may not otherwise be able to acquire the update simply.

In one embodiment, an update system for updating distributed devices is disclosed. The system includes one or more processors and a memory communicably coupled to the one or more processors. The memory stores a detection module including instructions that when executed by the one or more processors cause the one or more processors to, in response to acquiring, in a delivery device that is mobile, an update for a software package, identify an update target that is associated with at least one update device that includes the software package that is to be updated. The memory also stores a communication module including instructions that when executed by the one or more processors cause the one or more processors to communicate, upon locating the update target, the update directly to the at least one update device to permit the at least one update device to revise the software package using the update.

In one embodiment, a non-transitory computer-readable medium for updating distributed devices and including instructions that when executed by one or more processors cause the one or more processors to perform one or more functions is disclosed. The instructions include instructions to, in response to acquiring, in a delivery device that is mobile, an update for a software package, identify an update target that is associated with at least one update device that includes the software package that is to be updated. The instructions include instructions to communicate, upon locating the update target, the update directly to the at least one update device to permit the at least one update device to revise the software package using the update.

In one embodiment, a method for updating distributed devices is disclosed. In one embodiment, the method includes, in response to acquiring, in a delivery device that is mobile, an update for a software package, identifying an update target that is associated with at least one update device that includes the software package that is to be updated. The method includes communicating, upon locating the update target, the update directly to the at least one update device to permit the at least one update device to revise the software package using the update.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
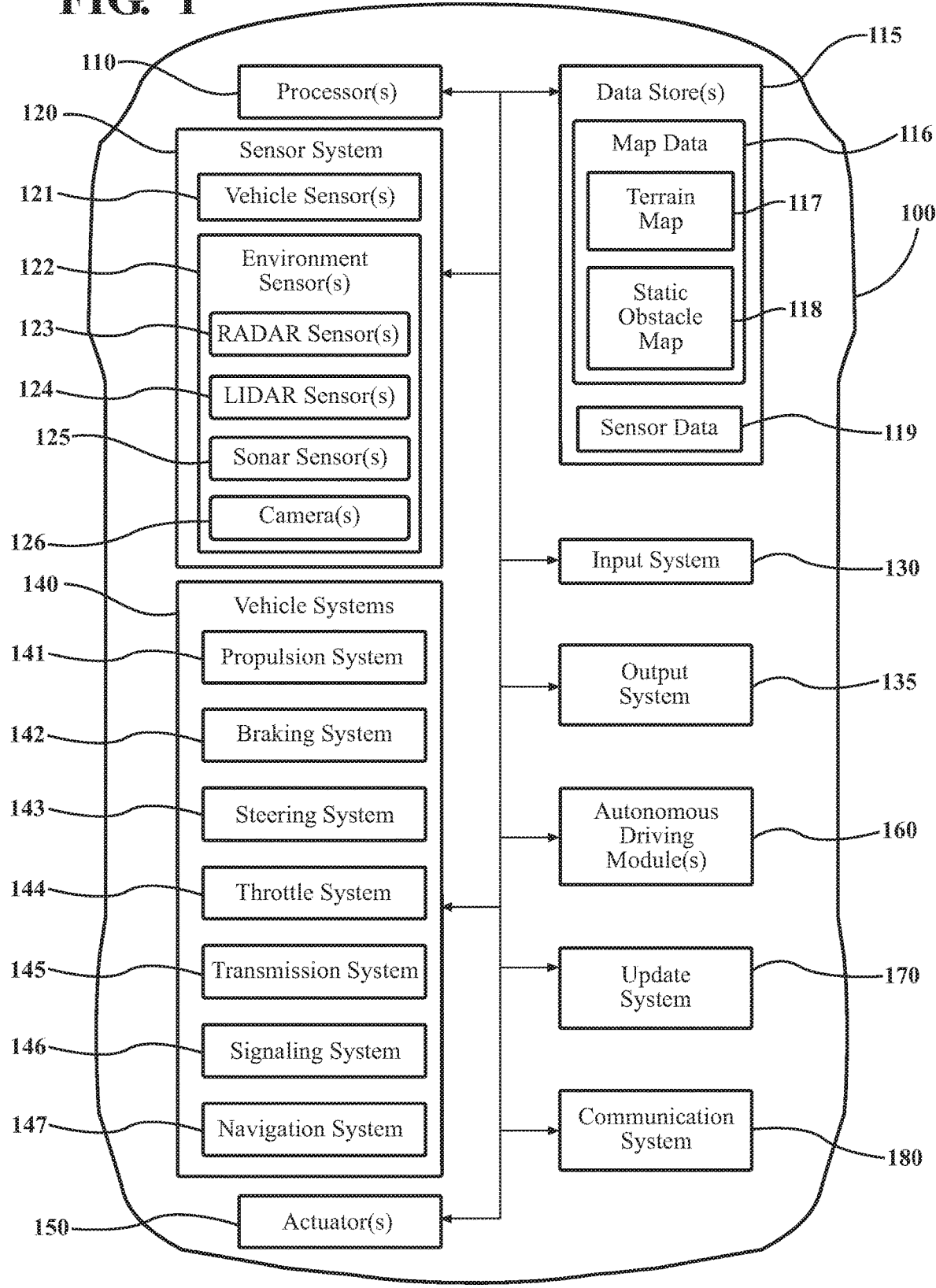
FIG. 1 illustrates one embodiment of a vehicle within which systems and methods disclosed herein may be implemented.

Systems, methods, and other embodiments associated with distributing software updates via peer-to-peer connections are disclosed. As previously noted, many devices include software-based systems that periodically update the software to maintain the functionality of the devices in relation to security updates, bug fixes, and other changes. However, many of the devices (e.g., Internet-of-things (IoT) devices, certain vehicles, etc.) may not have the ability to directly acquire updates from a server/cloud-based system due to bandwidth restrictions, the lack of particular hardware (e.g., long-range communication devices), power management considerations, lack of a local communication network, and so on. Thus, the devices may become outdated and thereby not function optimally or, in some cases, not function at all. Moreover, in further instances, the particular device that is seeking the update may include hardware and other components to acquire the update directly but may be currently outside of a service area for communications thereby resulting in failure to acquire the update.

As such, in one or more arrangements, the present disclosure describes systems and methods that provide for disseminating updates in an ad-hoc approach. For example, in one aspect, a system includes a mobile device or network of mobile devices such as vehicles that operate as mobility-as-a-service (MaaS) transports. The MaaS transports may function as ride-sharing vehicles, e-haling taxis, or in a similar capacity. Thus, the mobile device generally includes the ability to communicate with a server or cloud-based system to operate in the MaaS environment and also to acquire software updates for software that is executing on the device or for any software that is to be updated.

Moreover, the mobile device also generally has the ability to communicate directly via a peer-to-peer (p2p) connection (e.g., short-range wireless connection) with other devices such as those devices that need the update. Accordingly, in one approach, a system may use the mobile device as a distribution resource by adjusting routes when providing rides as a MaaS transport to navigate the mobile device proximate to update targets (e.g., an updating device and/or areas with multiple updating devices) and thereby provide the update directly to the devices. As one example, in various approaches, the mobile device may navigate to an update target such as a known location of a device or set of devices, an area where devices needing an update are predicted to be located (e.g., event, location corresponding with particular traffic patterns, etc.), a roadway corridor with statically mounted devices (e.g., smart traffic signs), and so on.

The system may identify the devices through wireless beacon messages, machine vision (e.g., license plate identification), and/or other such approaches. Once identified and located, the mobile device (i.e., the delivery device) establishes a peer-to-peer (P2P) connection with the updating device. In one embodiment, the mobile device generates the wireless beacon message to prompt the updating device about the availability of the update. That is, for example, the updating device receives the beacon message and can select whether to receive the update by establishing the P2P connection. In one embodiment, the updating device may prompt a supervisor process that generates a user interface element to which an affirmative or negative electronic input is received specifying whether to proceed with the update or not. In a further aspect, the supervisor process may select whether to proceed according to other factors such as available storage, current battery level, and so on. In either case, the beacon message induces the updating device to selectively accept the update transmission.

The system can then use the P2P connection to transfer the update to the updating device using wireless communications. As an additional consideration of providing the update, the mobile device may actively track/follow the device that is receiving the update along a route to ensure an adequate amount of time to transfer the update between the devices. Thus, the P2P connection may also serve to exchange route information and other useful information for the updating/tracking process. In this way, the mobile device functions as a distribution resource to improve the conveyance of the software update to other devices in need of the update that may not otherwise be able to acquire the update simply.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles, but embodiments are discussed in relation to automobiles as one example of a mobile device that may act as a distribution resource. In some implementations, the vehicle 100 may be any form of transport that, for example, includes the ability to communicate as outlined herein, and thus benefits from the functionality discussed herein. Moreover, in further aspects, the vehicle 100 instead may be a smartphone, tablet, or another device that is carried about by a delivery person or is otherwise mobile within a geographic region according to known routes.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services). That is, in one or more approaches, the vehicle 100 may include a single module such as an instance of the communication module 230 and the update system 170 is otherwise embodied in a cloud-computing environment or as a remote server entity. Thus, the update system 170 including the modules 220 and 230 are, in one or more arrangements, cloud-based and function to control devices such as the vehicle 100 to remotely distribute the update via a communication link therebetween.

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, as illustrated, the vehicle 100 includes an update system 170 that functions to provide updates to various devices encountered in a surrounding environment. As noted previously, because the various devices may otherwise be unable to presently receive the updates directly from a cloud-based/networked source such as an OEM, the vehicle 100 may instead download a software update to relay when such devices are encountered. Thus, in one embodiment, the update system 170 that is present in the mobile device (e.g., the vehicle 100 as shown), first acquires the software update. Once acquired, the vehicle 100 may undertake actions to identify/locate other devices in need of the update and/or receives direction from a remote version of the system 170 that conducts the distribution of the update. Thus, the system 170, in one or more arrangements, controls the vehicle 100 by adjusting a route of the vehicle in order to rendezvous with one or more devices needing the update.

It should be noted that the vehicle 100 is generally employed as, in one or more embodiments, a MaaS transport vehicle for which the system 170 is adjusting the route to facilitate rendezvous with the updating device(s). That is, the vehicle 100 is providing rides in a ridesharing service or as some other MaaS transport (e.g., e-hailing taxi) as a primary endeavor. Thus, the vehicle 100 may be underway for a trip, between trips, en route to pick up a rider, waiting for a subsequent trip, or otherwise functioning in support of one or more MaaS-related services. As such, the vehicle 100, in one or more embodiments, is generally navigating in support of a particular route to fulfill a trip. Accordingly, the system 170 can modify the route in order to facilitate the vehicle 100 passing nearby a device that is to be updated, and thereby facilitate distribution of the update. In further aspects, the system 170 may also track/follow the updating device when the device is moving in order to ensure the vehicle 100 remains within a distance of the updating device for an adequate amount of time to transfer the update.

Moreover, the system 170 as provided for within the vehicle 100 or another distributing device generally functions in cooperation with a communication system 180. In one embodiment, the communication system 180 communicates according to two or more communication standards. For example, the communication system 180 can include multiple different antennas/transceivers and/or other hardware elements for communicating at different frequencies and according to respective protocols. The communication system 180, in one arrangement, communicates via short-range communications such as a Bluetooth, WiFi, Dedicated Short Range Communication (DSRC); millimeter wave communication or another suitable protocol for communicating between the vehicle 100 and an updating device. Moreover, the communication system 180, in one arrangement, further communicates according to a long-range protocol such as global system for mobile communication (GSM), Enhanced Data Rates for GSM Evolution (EDGE), or another communication technology that provides for the vehicle 100 communicating with a cloud-based resource to, for example, acquire the update and other information. In a further approach, the communication system 180 communicates according to 3G, 4G, 5G, LTE, LTE-V2V, LTE-V2I, LTE-V2X, LTE-D2D, VoLTE, 5G-V2X or any other mobile data network or combination of mobile data networks to acquire the update and the other information. In either case, the system 170 can leverage various wireless communications technologies to provide communications from a cloud-based resource and to an updating device.

Figure 2:
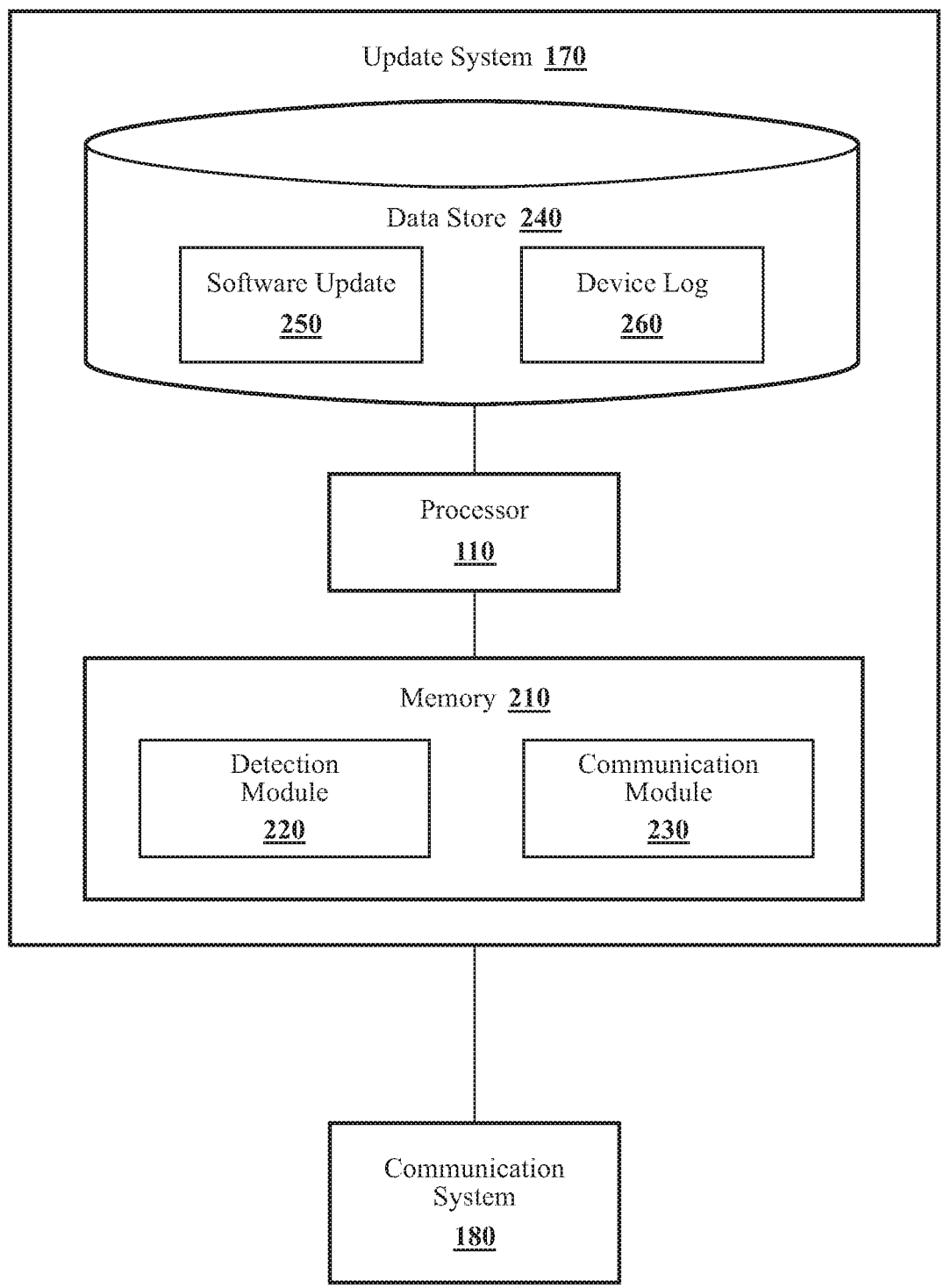
FIG. 2 illustrates one embodiment of an update system that is associated with distributing updates using a mobile device.

With reference to FIG. 2, one embodiment of the update system 170 is further illustrated. As shown, the update system 170 includes a processor 110. Accordingly, the processor 110 may be a part of the update system 170 or the update system 170 may access the processor 110 through a data bus or another communication path. In one or more embodiments, the processor 110 is an application specific integrated circuit that is configured to implement functions associated with a detection module 220 and a communication module 230. In general, the processor 110 is an electronic processor such as a microprocessor or other processing circuitry that is capable of performing various functions as described herein when implemented in combination with the noted instructions and/or modules.

In one embodiment, the update system 170 includes a memory 210 that stores the detection module 220 and the communication module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein. In one or more embodiments, the modules 220 and 230 are embedded in an on-chip memory of the processor 110.

Furthermore, in one embodiment, the update system 170 includes a data store 240. The data store 240 is, in one embodiment, an electronic data structure such as a database that is stored in the memory 210 or separately in another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes software update 250, and device log 260 along with, for example, other information that is used by the modules 220 and 230.

FIG. 2 further illustrates the previously noted relationship between the update system 170 and the communication system 180. That is, the update system 170 and the communication system 180 are operatively connected to exchange information. The connection may be, for example, a direct bus connection, an indirect bus connection, or another suitable communication pathway that facilitates functions of the update system 170 in relation to acquiring the software update 250 and communicating with various devices to provide the software update 250.

For example, in one embodiment, the detection module 220 includes instructions that when executed by the processor 110 cause the processor 110 to identify an update target (e.g., an updating device in need of the update 250). In one arrangement, the detection module 220 identifies the update target responsive to the communication module 230 receiving the software update 250. That is, when the communication module 230 receives the update 250, additional metadata included with the update 250 may further specify an identity of one or more devices that are to receive the update 250. Additionally, the metadata may also indicate a location of the device(s), a geographic area or rendezvous point, a new route for the vehicle 100, and so on.

Alternatively, the update system 170, in one approach, maintains the software update 250 in a library of updates for the vehicle 100 itself or for purposes of distribution and, for example, receives distribution requests separately. That is, the update system 170 within the vehicle 100, in one embodiment, receives distribution requests that identify update targets indicating, for example, devices, locations, and/or another manner in which the vehicle 100 is to distribute the update 250. Further aspects of the requests will be discussed subsequently in combination with method 300.

Continuing with FIG. 2, the software update 250 is, in one or more configurations, an amendment or patch to a software application that resolves or at least attempts to resolve bugs, security issues, and other issues within the functioning of the software application. In further aspects, the software update 250 can include revisions to the software application that provide additional functionality, additional compatibility, and/or other features. Accordingly, the present disclosure generally envisions the software update 250 to broadly encompass any change/addition to the software application, although particular implementations may focus on sub-groups such as security updates and/or bug fixes.

The software application itself can be, for example, an operating system, a utility, or generally any software application that may execute on the noted devices. In one or more aspects, the software application is a sub-module of an autonomous vehicle control system or other vehicle-related system. In still a further aspect, the software application is a utility software package that controls an infrastructure device (e.g., traffic signal), infrastructure communication device (e.g., vehicle-to-infrastructure (V2I)), an Internet-of-things (IoT) device, or simply a general purpose device such as a tablet or other computer.

Continuing with the discussion of the detection module 220, the update device(s) identified by the request/metadata generally does not receive the update 250 over a networked communication link as in the case of the vehicle 100 and other devices. Instead, the update device, as previously noted, may rely on direct updating via another mechanism such as a short-range communication from a service device. However, because the service device may be tied to a mechanic, service worker, or other limited resource (e.g., geographically limited, time-limited, etc.) executing the update process, the service device may not adequately distribute the update 250 to devices in need within a timely manner. Thus, the vehicle 100 can function as a delivery device to provide the update 250.

As such, upon notification of the updating/target device or group of possible devices, the detection module 220, in one approach, identifies a remote location where the target device is to be located. It should be appreciated that while this discussion generally focuses on identifying a single particular device and a location of that device, in further aspects, the directive (i.e., the distribution request) to distribute the update 250 specifies a specific group of devices and a particular location of the devices (e.g., infrastructure devices along a roadway corridor), a general group of devices and an associated location (e.g., vehicles likely to be parked near a concert venue), and so on. As such, the general discussion of identifying/locating the target/updating device is, in further aspects, more broadly applicable to groups of devices that are specifically identified or not.

Accordingly, the detection module 220 can receive the particular location as part of the original request or query a device log 260 that indicates previously known locations. In either case, the detection module 220 re-routes the delivery device (i.e., the vehicle 100) to rendezvous with the at least one updating device. It should be appreciated that, as previously noted, the vehicle 100 is generally operating as a MaaS transport and thus is generally already assigned a particular route. Thus, the requests may be generated according to known routes of the vehicle in order to minimally alter a route of the delivery device such that a route is not unduly extended when performing the update process. For example, the requests may be directed to vehicles that can navigate alternative routes to a destination that provide for rendezvousing with the updating device and involve taking a parallel route with a similar arrival time or a slightly extended arrival time. Of course, depending on the particular implementation, the extent of the re-routing may vary according to particular circumstances.

The detection module 220, in one embodiment, further functions to identify the update device(s) and locate the update device(s) when proximate thereto. That is, simply routing the vehicle 100 to a location of the update target where the update device(s) should be found is generally not adequate to ensure the update 250 is communicated to the update device(s). Thus, in one embodiment, the detection module 220 further functions to locate update device(s) by using active perceptions. For example, the detection module 220 can cause the communication system 180 to iteratively broadcast a beacon communication, to monitor for communications from the update device(s), to perform machine perception using sensors of the vehicle 100 (e.g., image recognition via cameras), and so on thereby actively locating the update device(s).

Continuing with FIG. 2, in one embodiment, the communication module 230 includes instructions that when executed by the processor 110 cause the processor 110 to, upon locating the update device, communicate the update directly to the update device to permit the at least one update device to revise the software package using the update 250. In one embodiment, the communication module 230 generates the wireless beacon message to prompt the update device about the availability of the update. That is, for example, the update device receives the beacon message and can select whether to receive the update by establishing a P2P connection with the update system 170. In one embodiment, the update device may prompt a supervisor process that generates a user interface element to which an affirmative or negative electronic input is received specifying whether to proceed with the update or not (e.g., whether to establish the P2P connection and receive the update 250). In a further aspect, the supervisor process may select whether to proceed according to other factors such as available storage, current battery level, and so on. In either case, the beacon message induces the update device to selectively accept the update 250.

For example, in one approach, upon initially locating the update device, the communication module 230 initiates communications with the update device to establish a direct peer-to-peer (p2p) connection. In one embodiment, the communication module 230 establishes the p2p connection over a short-range communication channel (e.g., WiFi, Bluetooth, DSRC, millimeter wave communication etc.). Thus, the communication channel may define a communication range (e.g., 100 meters) within which the vehicle 100 is to be located relative to the update device for communications to be exchanged. In further aspects, the communication module 230 establishes the communication channel through a secure exchange of information (e.g., cryptographic keys) in order to authenticate the devices and provide for ensuring the security of exchanged communications. In a further aspect, the communication module 230 uses two or more protocols for short-range communication with the updating device and may switch between protocols depending on a particular distance to the updating device.

The communication module 230 then communicates the update 250 to the update device in order to distribute the update 250 on behalf of an originator (e.g., OEM). Moreover, in one approach, locating and communicating the update further involves tracking/following the update target within a defined range (e.g., the communication range) once located. Because the update target may be moving along a route, and because the communication of the update 250 is generally not instantaneous and may occur over an amount of time depending on a size of the update 250 and a bandwidth of the communication channel, the communication module 230, in one embodiment, causes the vehicle 100 to follow the update device. In general, the communication module 230 may define a following distance according to the communication range in order to ensure that communications between the module 230 and the update device do not lapse thereby causing the transfer of the update 250, at least temporarily, to fail. In further aspects, the vehicle 100 is, for example, an autonomous vehicle and thus the communication module 230 can cause an autonomous driving module 160 to control the vehicle 100 to maintain the indicated distance.

In further aspects, the update device and the update system 170 maintain communications throughout the update process to support platooning the vehicles together. That is, the communication module 230 exchanges control information (e.g., speed, upcoming maneuvers, etc.) with the update device in order to control the vehicles to maintain a distance within the communication range. In this way, the update system 170 can further ensure reliable transfer of the update 250.

Figure 3:
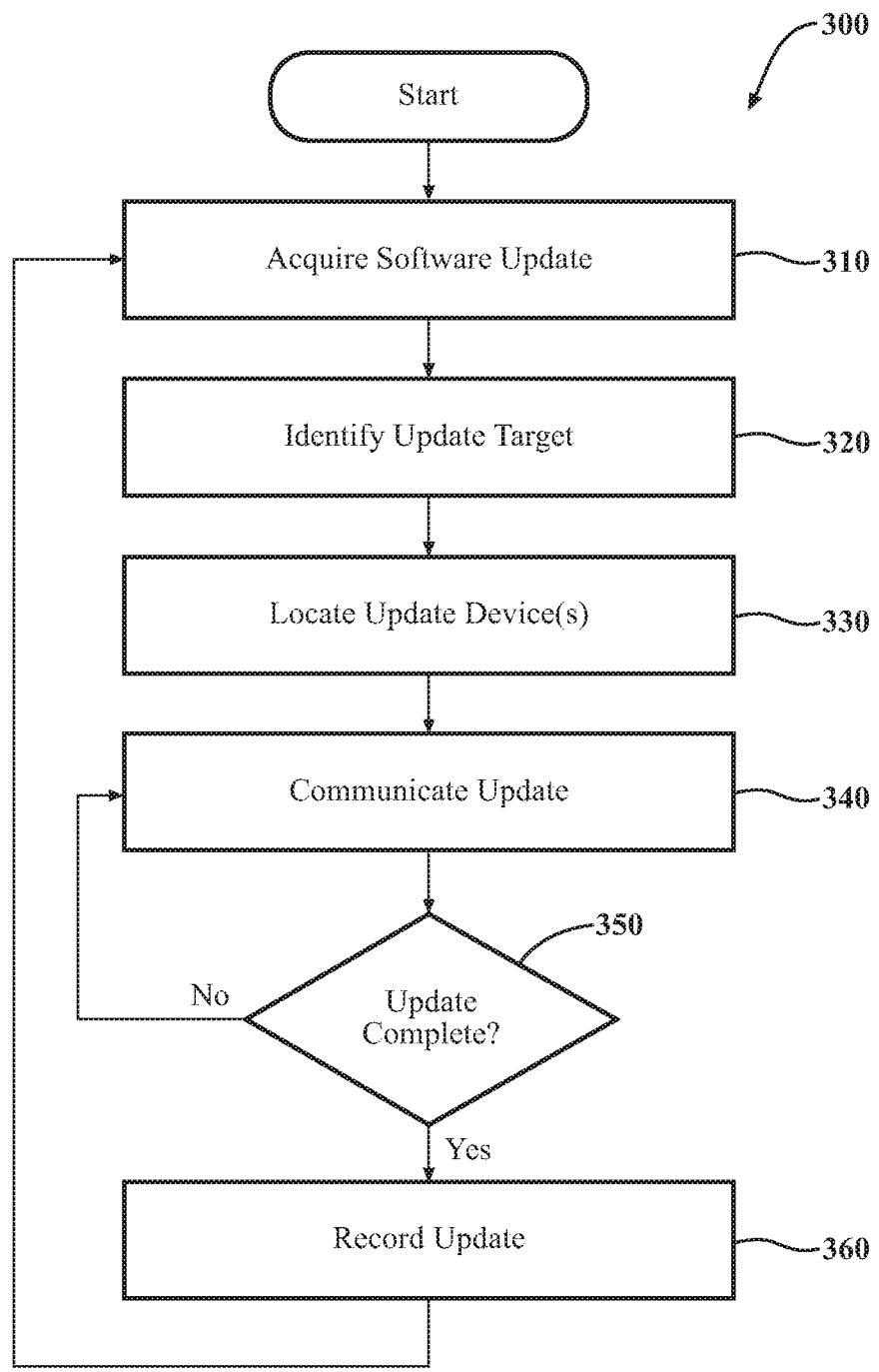
FIG. 3 is a flowchart illustrating one embodiment of a method associated with updating distributed devices using a mobile device traveling through an environment.

As a further explanation of how the present approach provides for distributed updates consider FIG. 3, which illustrates one embodiment of a method 300 associated with updating distributed devices by dispatching resources to provide the updates. Method 300 will be discussed from the perspective of the update system 170 of FIGS. 1-2. While method 300 is discussed in combination with the update system 170, it should be appreciated that the method 300 is not limited to being implemented within the update system 170 but is instead one example of a system that may implement the method 300. Moreover, while FIG. 3 illustrates the flowchart of method 300 in a serial manner, it should be appreciated that one or more of the noted functions may execute in parallel.

As illustrated, at 310, the update system 170 acquires, an update 250 for a software package. In one embodiment, the occurrence of acquiring the update 250 further induces the update system 170 to distribute the update 250 to target devices as may be defined along with metadata received with the update 250. However, it should be appreciated, that in further approaches, the update 250 may be resident on the vehicle 100 as, for example, a previously installed update, and the update system 170 proceeds to distribute the update 250 responsive to receiving a specific distribution request from a cloud-based component of the system 170. Additionally, or, alternatively, for example, the update system distributes the update 250 as a function of encountering a device that is without the update 250 without having a specific directive to do so (e.g, a distribution request). Thus, the acquisition of the update 250 can further include a distribution request, although the present disclosure does also encompass circumstances that do not involve a specific request. Moreover, as previously noted, the update 250 may include revisions to code of the software package and revisions to data used by the code. In further aspects, the update 250 may be further comprised of multiple separate updates to one or more software applications.

At 320, the update system 170 identifies an update target. In one embodiment, the update target indicates at least one update device that includes the software package that is to be updated. Alternatively, or additionally, the update target, in one embodiment, specifies a class of devices to be updated, a general location (e.g., within a geo-fenced area), a particular event/location (e.g., a sporting venue), and so on. Thus, the update target may vary in specificity from indicating a single particular device and a location of the device to simply indicating a broad geographic area and a particular class of devices (e.g., vehicles of a particular make and model).

In various approaches, the detection module 220 identifies the update target by, for example, parsing a distribution request for identifying information about a specific device and/or a location associated with the device. In further aspects, the detection module 220 may query various resources to identify the device/location such as a device log 260 that is co-located with the update system 170 in the vehicle 100 or is provided remotely as a cloud-based resource. The device log 260 is, in one embodiment, a ledger that includes information about devices including identifying aspects (e.g., media access controller (MAC) addresses, license plate numbers, etc.), software version information (e.g., a current installed version), previous location information, and so on. Accordingly, the update system 170 can leverage the device log 260 to determine information about targets, and, for example, which devices to update.

At 330, the update system 170 locates the update target. In one embodiment, the detection module 220 locates the update target by initially determining a likely location of the update device and, for example, re-routing the vehicle 100 to rendezvous with the update device. The re-routing can include receiving a revised route from a cloud-based service, receiving a waypoint associated with the location of the update device and altering the current route, and so on. As an additional aspect of re-routing, the update system 170, in one approach, adapts a route of a current trip that is a MaaS related trip (e.g., ridesharing). However, the update system 170 generally prioritizes the MaaS trip since riders pay for the service. As such, the update system 170 employs an optimization heuristic to weigh adjustments to routes in order to avoid overly extending a trip.

In a further aspect, the update system 170 re-routes the vehicle 100 when the vehicle 100 is not servicing a MaaS trip. That is, the update system 170 can stage the vehicle 100 at a particular location while waiting for a trip such that the location is exposed to many different devices that may need the update 250. For example, the staging location may be near a busy intersection, at a particular venue (e.g., sporting venue, theater, etc.), and so on.

In either case, the detection module 220 generally controls the vehicle 100 (i.e., the delivery device) to move to a location of the update target according to the re-routing. In this way, the distribution request effectively dispatches the vehicle 100 to the location to transfer the update 250. As noted, the location is, in one embodiment, one or more of: an event area associated with an event at which the update device is expected to be present, and an infrastructure area defining a segment of a roadway along which the update device is expected to be present, and so on, and thus accounts for exposure to a particular update device and/or various potential groups of devices.

When present at a location associated with the update device, the update system 170 is still generally tasked with specifically locating the update device. Thus, in one or more embodiments, the detection module 220 implements active locating routines to acquire a fix on the update device. As previously specified, the particular form of the routines may vary but generally includes whichever means are available from the vehicle 100 or other mobile device that is implementing the update system 170. Accordingly, the detection module 220, in one embodiment, uses the direct communication means (e.g., short-range communication mechanism) to provide beacon messages announcing the presence of the vehicle 100 in order to evoke a response by the update device and initiate communications. In further aspects, the detection module 220 employs additional or alternative mechanisms such as image recognition to identify license plates or other identifying features in locating the update device.

At 340, the communication module 230 communicates the update 250 directly to at least one update device. In one embodiment, the communication module 230 establishes a direct peer-to-peer (p2p) connection between the delivery device and the at least one update device over which the vehicle 100 transfers the update 250. In this way, the update system 170 permits the update device to revise the software package using the update 250 without relying on a direct connection to a primary distribution source such as a cloud-based server.

At 350, the communication module 230, in one embodiment, iteratively checks a transfer status of the update 250 to the update device. If the update is not complete, then the communication module 230 continues the transfer. If the update is completed, then the communication module 230 continues to record the transfer at block 360. However, as previously noted, because the nature of the update device and the vehicle 100 is intrinsically mobile, the update device may not be stationary relative to the vehicle 100.

Accordingly, in one embodiment, the communication module 230 causes the vehicle 100 to travel with the update device when the update device is moving along a route. As such, the communication module 230 can use the prior established communication channel or a separate channel to convey information that links movements of the vehicle 100 with the update device. That is, the communication module 230 can exchange routing information, trajectory information, current transfer status, platooning information, and so on to maintain a communication range until the transfer is complete. Once the communication module 230 determines the transfer is complete, the vehicle 100 discontinues following/tracking the update device and continues along a route. In various aspects, the extent to which the vehicle 100 will follow the update device may depend on, for example, whether the vehicle 100 is underway with a MaaS trip or not. That is, if following the update device will exceed an acceptable margin (e.g., less than 5% of an overall trip) of deviation for a trip, then the communication module 230 can abort the transfer.

In general, the communication module 230 assesses the viability of tracking/following the update device at the onset of establishing communications in order to avoid extensively re-routing the vehicle 100 when underway with a MaaS trip. Of course, when no MaaS trip is underway, the vehicle 100 may take greater liberties. In either case, the communication module 230 assesses the viability of the transfer according to transfer rates for the communication channel and a known file size of the update 250. In this way, if the projected deviation in the route exceeds the noted margin, then the transfer can be pre-emptively aborted.

At 360, the communication module 230 records the encounter with the update device. In one embodiment, the communication module 230 records the transfer, whether the transfer was successful and other useful information (e.g., current version of the software and other software, current locations, etc.). The communication module 230 can upload the noted information into the device log 260 that is maintained locally or remotely in the cloud-based system. In either case, the transfer is recorded to maintain logs about the status of the update device.

Figure 4:
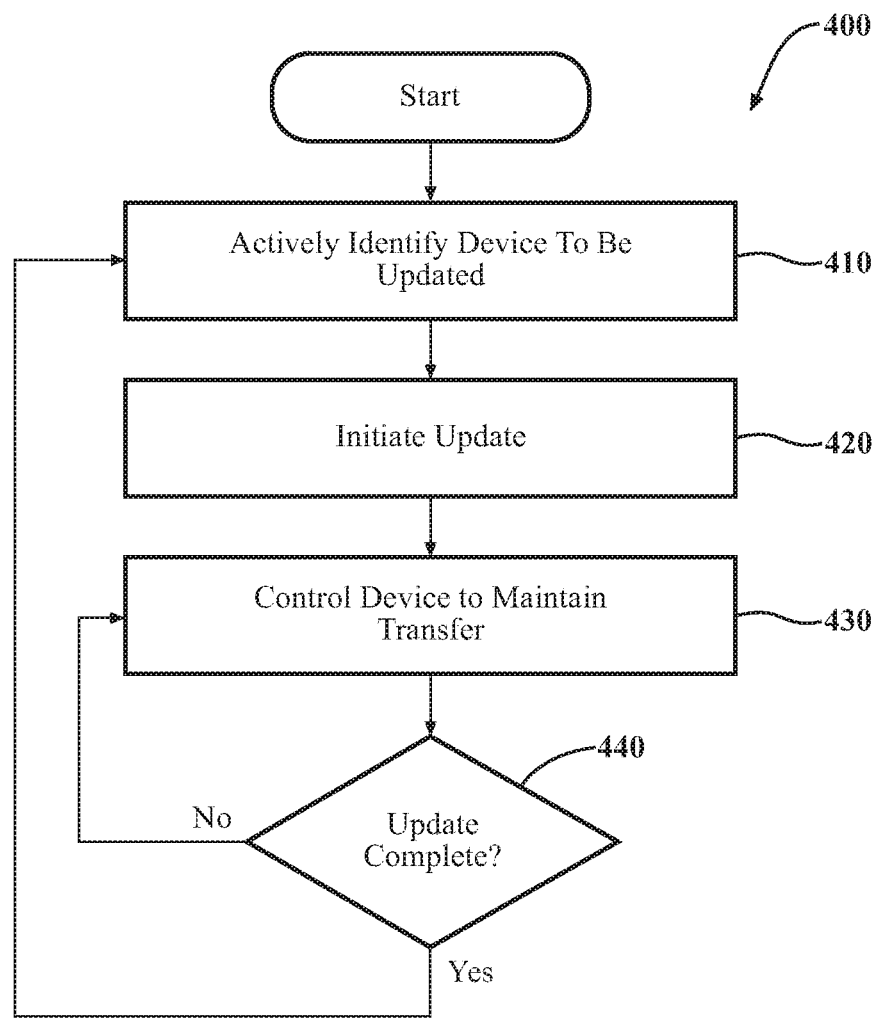
FIG. 4 is a flowchart illustrating one embodiment of a method associated with relaying updates between devices.

FIG. 4 illustrates one embodiment of a method 400 that is a separate implementation of method 300 from FIG. 3. Thus, for purposes of brevity of this discussion, similar elements will not be repeated or re-explained. In a similar fashion as with method 300, method 400 will be discussed from the perspective of the update system 170 of FIGS. 1-2. While method 400 is discussed in combination with the update system 170, it should be appreciated that the method 400 is not limited to being implemented within the update system 170 but is instead one example of a system that may implement the method 400. Moreover, while FIG. 4 illustrates the flowchart of method 400 in a serial manner, it should be appreciated that one or more of the noted functions may execute in parallel.

As a preliminary matter, the discussion of FIG. 4 assumes that the vehicle 100 has previously acquired the update 250 whether as an update to a software application executing on the vehicle 100 or simply to store and redistribute. Moreover, while the method 400 is discussed in relation to the vehicle 100, the method 400 is generally applicable in a broader sense to devices that receive the update 250 via a short-range communication and then subsequently provide the update 250 via the short-range communication and may not have the ability to communicate via long-range communications (e.g., cellular) to acquire the update 250.

At 410, the detection module 220 actively identifies update devices that are in need of the update 250. That is, in contrast to the prior discussion of method 300 where the update system 170 receives a distribution request and actively seeks out a particular device or set of devices, in relation to method 400, the detection module 220 does not have a particular target device. Instead, in at least one embodiment, the detection module 220 is further distributing the update 250 to any device in need that is encountered.

As such, at 410, the detection module 220 actively identifies update device(s) to be updated. In one approach, the detection module 220 actively broadcasts the presence of the update system 170 for providing the update 250. Thus, the detection module 220 can cause a wireless communication to be transmitted that identifies the availability of the update 250. Alternatively, or additionally, the detection module 220, in one approach, employs active perception mechanisms such as image recognition to identify the update device(s) from which the update process can be initiated. The image recognition may include identification of license plate numbers or other identifiers that provide for dynamically determining whether the perceived device is an update device needing the update 250.

At 420, the communication module 230 initiates communications with the identified update device from block 410. In one approach, the communication module 230 functions in a similar fashion as disclosed at block 340 of method 300 to provide the update 250 to the identified device.

At 430, the communication module 230 controls the mobile device (e.g., the vehicle 100) to maintain the transfer of the update 250. In one embodiment, the communication module 230 maintains the transfer by tracking/following the update device as previously explained in relation to method 300. Of course, in an instance where the update device is not mobile, or the transfer can be completed within an amount of time that the update device is to be within range of the vehicle 100, then the communication module 230 simply monitors the transfer without causing the vehicle 100 to navigate and follow the update device.

At 440, the communication module 230 determines whether the transfer of the update 250 is completed. Once the transfer is complete, the update system 170 can continue monitoring for further devices to relay the update 250. In this way, the update system 170 provides for propagating the update 250 among additional devices to improve distribution.

Figure 5:
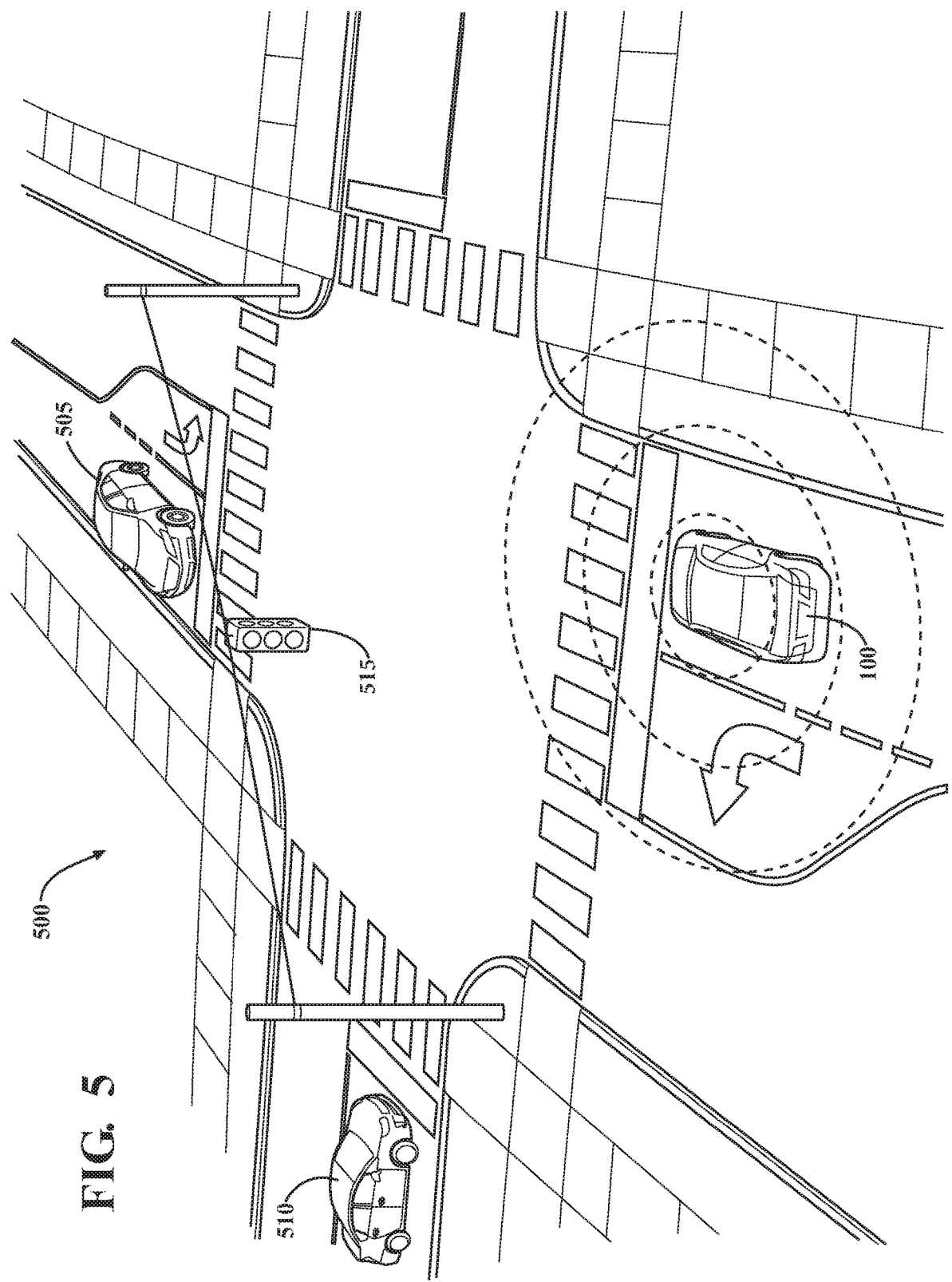
FIG. 5 illustrates one example of a mobile device encountering devices needing to be updated and providing the update according to approaches disclosed herein.

As a further explanation of how the update system 170 improves the distribution of the update 250, the update system 170 will now be discussed in relation an example as illustrated in FIG. 5. FIG. 5 is a diagram depicting an intersection 500. As shown, the intersection includes the vehicle 100, as previously described, two additional vehicles 505 and 510, and a traffic signal 515. Consider that the vehicle 100 includes the update system 170, or at least a portion thereof, and is provided with a target that identifies the traffic signal 515 for the update 250. Thus, the update system 170 receives the distribution request and adjusts a current MaaS rideshare route to pass through the intersection and communicate the update to the traffic signal 515.

In a separate example, the vehicle 100 receives a distribution request specifying the intersection as an update target and indicating a set of vehicles (e.g., 510 and 505) as update devices that are to receive the update 250. Accordingly, the update system 170 causes the vehicle 100 to route through the intersection and rendezvous with the vehicles 505 and 510 to transfer the update 250 to the vehicles 505, 510. In still a further example, the distribution request may identify a single vehicle (e.g., vehicle 510). Thus, the update system 170 dispatches the vehicle 100 to rendezvous with the vehicle 510 and transfer the update 250. However, in the instant example, because the update 250 is larger in size and cannot be wholly transferred while the vehicles wait at the intersection, the update system 170 causes the vehicle 100 to follow the vehicle 510 within a defined communication range in order to maintain the transfer of the update 250. Thus, once the transfer of the update 250 is complete, the vehicle 100 can continue along a prior route. In this way, the update system 170 improves the distribution of software updates by leveraging a distributed network of mobile devices to dynamically transfer the update in the wild and thereby avoid difficulties associated with outdated devices that otherwise cannot communicate directly with a source (e.g., OEM, Internet-based source) to receive the update.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the update system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the update system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the update system 170, and/or the autonomous driving module(s) 160 may control some or all of these vehicle systems 140 and, thus, may be partially or fully autonomous.

The processor(s) 110, the update system 170, and/or the autonomous driving module(s) 160 can be operatively connected to communicate with the various vehicle systems 140 and/or individual components thereof. For example, returning to FIG. 1, the processor(s) 110, the update system 170, and/or the autonomous driving module(s) 160 can be in communication to send and/or receive information from the various vehicle systems 140 to control the movement, speed, maneuvering, heading, direction, etc. of the vehicle 100. The processor(s) 110, the update system 170, and/or the autonomous driving module(s) 160 may control some or all of these vehicle systems 140.

The processor(s) 110, the update system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the update system 170, and/or the autonomous driving module(s) 160 can control the direction and/or speed of the vehicle 100. The processor(s) 110, the update system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the update system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the software update 250 as implemented by the communication module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An update system for updating distributed devices, comprising:
   one or more processors;
   a memory communicably coupled to the one or more processors and storing:
   a detection module including instructions that when executed by the one or more processors cause the one or more processors to, in response to acquiring, in a delivery device that is mobile, an update for a software package, identify an update target that is associated with at least one update device that includes the software package that is to be updated,
wherein the detection module includes instructions to identify the update device including instructions to re-route the delivery device that is enroute on an original route to rendezvous with the update device by altering the original route of the delivery device at multiple points in time to an updated route that is distinct from the original route while prioritizing waypoints of the original route associated with a mobility-as-a-service (MaaS) trip to avoid extending ride times of passengers and providing a dynamic location of the update device as a new destination of the updated route that is adjusted according to changes in the dynamic location of the update target; and
a communication module including instructions that when executed by the one or more processors cause the one or more processors to communicate, upon locating the update target, the update directly to the at least one update device to permit the at least one update device to revise the software package using the update,
wherein the communication module includes instructions to communicate the update including instructions to follow the update target while the update device is in motion to maintain communication with the update device and control the delivery device to maintain a communication distance with the update device by following the update device while the update device is in motion to provide a sufficient amount of time within range of the update device for the delivery device to communicate the update.

2. The update system of claim 1, wherein the detection module include instructions to identify the update target including instructions to identify the dynamic location relative to the delivery device where the at least one update device is expected to be located, and
wherein the update includes one or more of: revisions to code of the software package, and revisions to data used by the code.

3. The update system of claim 1, wherein the detection module includes instructions to re-route the delivery device including instructions to alter a current route of the delivery device to at least pass proximate to the at least one update device, and
wherein the detection module includes instructions to re-route including instructions to alter a route of the delivery device while the delivery device is acting as a is a mobility-as-a-service (MaaS) vehicle.

4. The update system of claim 1, wherein the detection module includes instructions to locate the update target including instructions to control the delivery device to move to a determined location of the update target, and
wherein the determined location includes an event area associated with an event at which a group of devices including the at least one update device that are to be updated are expected to be present.

5. The update system of claim 1, wherein the communication module includes instructions to communicate including instructions to establish a direct peer-to-peer (p2p) connection between the delivery device and the at least one update device over which the delivery device provides the update, and
wherein the at least one update device does not receive the update over a networked communication link.

6. The update system of claim 1, wherein the detection module includes instructions to identify the update target including instructions to dynamically identify the at least one update device according to an active perception of the at least one update device, the active perception including one or more of: recognizing the at least one update device through analysis of an image, and recognizing the at least one update device through reception of a wireless beacon communication, wherein the wireless beacon communication prompts the update device to selectively initiate transfer of the update, and
wherein the communication module includes instructions to communicate the update to the at least one update device to cause the at least one update device to relay the update onto subsequent devices that the update device encounters so that the update is further propagated.

7. The update system of claim 1, wherein the delivery device is an autonomous vehicle operating as a rideshare vehicle.

8. A non-transitory computer-readable medium for updating distributed devices having instructions to:
in response to acquiring, in a delivery device that is mobile, an update for a software package, identify an update target that is associated with at least one update device that includes the software package that is to be updated,
wherein the instructions to identify the update device include instructions to re-route the delivery device that is enroute on an original route to rendezvous with the update device by altering the original route of the delivery device at multiple points in time to an updated route that is distinct from the original route while prioritizing waypoints of the original route associated with a mobility-as-a-service (MaaS) trip to avoid extending ride times of passengers and provides a dynamic location of the update device as a new destination of the updated route that is adjusted according to changes in the dynamic location of the update target; and
communicate, upon locating the update target, the update directly to the at least one update device to permit the at least one update device to revise the software package using the update, wherein the instructions to communicate the update include instructions to follow the update target while the update device is in motion to maintain communication with the update device and control the delivery device to maintain a communication distance with the update device by following the update device while the update device is in motion to provide a sufficient amount of time within range of the update device for the delivery device to communicate the update.

9. The non-transitory computer-readable medium of claim 8, wherein the instructions to identify the update target include instructions to identify the dynamic location relative to the delivery device where the at least one update device is expected to be located, and
wherein the update includes one or more of: revisions to code of the software package, and revisions to data used by the code.

10. The non-transitory computer-readable medium of claim 8, wherein the instructions to re-route the delivery device include instructions to alter a current route of the delivery device to at least pass proximate to the at least one update device, and wherein the instructions to re-route including instructions to alter a route of the delivery device while the delivery device is acting as a is a mobility-as-a-service (MaaS) vehicle.

11. The non-transitory computer-readable medium of claim 8, wherein the instructions to locate the update target including instructions to control the delivery device to move to a determined location of the update target,
wherein the determined location is one or more of: an event area associated with an event at which the at least one update device is expected to be present, and an infrastructure area defining a segment of a roadway along which the at least one update device is expected to be present, and
wherein the at least one update device is an infrastructure device that is statically mounted along the roadway.

12. The non-transitory computer-readable medium of claim 8, wherein the instructions to communicate the update include instructions to control the delivery device to maintain a communication distance with the update device by following the update device while the update device is in motion to provide a sufficient amount of time within range of the update device for the delivery device to communicate the update,
wherein the instructions to communicate include instructions to establish a direct peer-to-peer (p2p) connection between the delivery device and the at least one update device over which the delivery device provides the update, and
wherein the at least one update device does not receive the update over a networked communication link.

13. A method of updating distributed devices, comprising:
in response to acquiring, in a delivery device that is mobile, an update for a software package, identifying an update target that is associated with at least one update device that includes the software package that is to be updated,
wherein identifying the update device includes re-routing the delivery device that is enroute on an original route to rendezvous with the update device by altering the original route of the delivery device at multiple points in time to an updated route that is distinct from the original route while prioritizing waypoints of the original route associated with a mobility-as-a-service (MaaS) trip to avoid extending ride times of passengers and provides a dynamic location of the update device as a new destination of the updated route that is adjusted according to changes in the dynamic location of the update target; and
communicating, upon locating the update target, the update directly to the at least one update device to permit the at least one update device to revise the software package using the update,
wherein communicating the update includes following the update target while the update device is in motion to maintain communication with the update device, and controlling the delivery device to maintain a communication distance with the update device by following the update device while the update device is in motion to provide a sufficient amount of time within range of the update device for the delivery device to communicate the update.

14. The method of claim 13, wherein identifying the update target includes identifying the dynamic location relative to the delivery device where the at least one update device is expected to be located, and
wherein the update includes one or more of: revisions to code of the software package, and revisions to data used by the code.

15. The method of claim 13, wherein re-routing the delivery device includes altering a current route of the delivery device to at least pass proximate to the at least one update device, and
wherein re-routing includes altering a route of the delivery device while the delivery device is acting as a mobility-as-a-service (MaaS) vehicle.

16. The method of claim 13, wherein locating the update target includes controlling the delivery device to move to a determined location of the update target, and wherein the determined location is an event area associated with an event at which a group of devices including the at least one update device that are to be updated are expected to be present.

17. The method of claim 13, wherein communicating includes establishing a direct peer-to-peer (p2p) connection between the delivery device and the at least one update device over which the delivery device provides the update, and
wherein the at least one update device does not receive the update over a networked communication link.

18. The method of claim 13, wherein identifying the update target includes dynamically identifying the at least one update device according to an active perception of the at least one update device, the active perception including one or more of: recognizing the at least one update device through analysis of an image, and recognizing the at least one update device through reception of a wireless beacon communication, wherein the wireless beacon communication prompts the update device to selectively initiate transfer of the update, and
wherein communicating the update to the at least one update device causes the at least one update device to relay the update onto subsequent devices that the update device encounters so that the update is further propagated.

* * * * *